March 21, 1967  R. W. A. SCARR ETAL  3,310,725
TUNNEL DIODE D.C. TO D.C. CONVERTERS
Filed Dec. 16, 1963  2 Sheets-Sheet 2

Inventors
ROBERT W. A. SCARR
MALCOLM R. McCANN
By
Attorney

United States Patent Office 3,310,725
Patented Mar. 21, 1967

3,310,725
TUNNEL DIODE D.C. TO D.C. CONVERTERS
Robert Walter Alister Scarr and Malcolm Richdale McCann, London, England, assignors to International Standard Electric Corporation, New York, N.Y., a corporation of Delaware
Filed Dec. 16, 1963, Ser. No. 330,876
Claims priority, application Great Britain, Dec. 21, 1962, 48,323/62
5 Claims. (Cl. 321—2)

The present invention relates to self-oscillating inverter and converter circuits using tunnel diodes.

Known inverter circuits have been used for transforming direct current energy to alternating current energy. When such circuits are combined with known rectifier circuits or in themselves perform a rectifying function, as is done, for instance, by synchronous vibrators and thus concert direct current energy at one voltage to direct current energy at another and usually higher voltage, then they are termed D.C. to D.C. converter circuits. Most known inverter circuits suffer from the disadvantage that they are either not capable of operating with rather low input voltages or capable of doing so only at appreciable loss of efficiency for input voltages of less than about 1½ volts.

A requirement for inverters and converters capable of operating at an acceptable degree of efficiency arises in applications where the generators of electrical energy can supply only low voltages at relatively large currents. Examples of such applications are fuel cells, solar batteries and electrolytic tank generators.

According to the invention there is provided an oscillatory inverter circuit comprising a series combination of a source of unidirectional voltage, a chain of series connected tunnel diodes and inductor shunted by a capacitance, wherein an alternating voltage is generated across said inductor from which the electrical output is derived.

According to one feature of the invention there is provided a D.C. to D.C. converter circuit comprising an inverter circuit in accordance with the invention, wherein said alternating voltage is applied to a rectifier circuit from which a unidirectional current may be drawn.

The invention will now be described with reference to the accompanying drawings in which.

Figure 1:
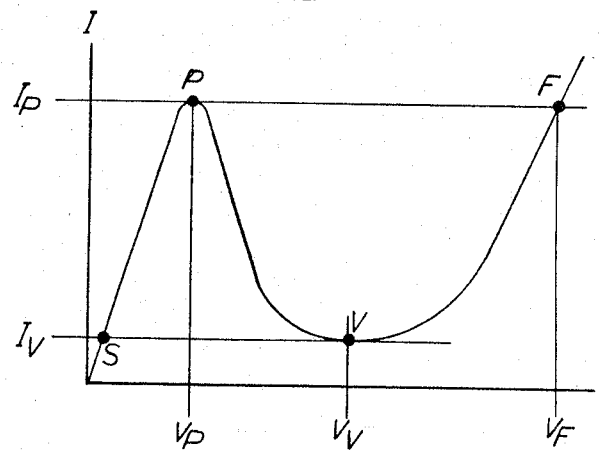
FIG. 1 illustrates the typical current-voltage relationship of a tunnel diode.

FIG. 1, which illustrates the typical current-voltage characteristic of a tunnel diode, sometimes referred to as an Esaki-diode, shows that characteristic to have three distinct regions in the current-voltage quadrant in which the tunnel diodes are utilised in the circuits to be hereinafter described. The first region between the origin of the characteristic curve and the peak point P shows the tunnel diode to have positive incremental resistance which rapidly becomes infinite as the peak voltage $V_p$ and the peak current $I_p$ are approached. The second region between the peak point P and the valley point V is a region of negative increment resistance, which increases to infinity as the point corresponding to the valley current $I_v$ and the valley voltage $V_v$ is approached. Beyond this point V lies the third region in which the incremental resistance is positive once again and which includes an operating point F, at which the forward voltage has a value of $V_f$ when the forward current through the diode has a value substantially equal to that of the peak current $I_p$.

The inverter circuits to be described utilise the region of negative incremental resistance of the tunnel diode to obtain an oscillatory mode of operation of a chain of series connected tunnel diodes. Each tunnel diode of the chain acts as a switch between a low chord resistance state in the aforementioned first region and a high chord resistance state in the aforementioned third region. The cyclically repeated switching action of the tunnel diodes enables energy to be transferred from a source of energy at a unidirectional voltage via a transformer to a secondary circuit, thereby providing an alternating current output. The secondary circuit of the transformer may include a rectifying circuit to provide direct current energy in the conventional manner of D.C. to D.C. converters. The power needed for the continuous operation of the periodic switching of the tunnel diodes is supplied by the D.C. voltage.

Figure 2:
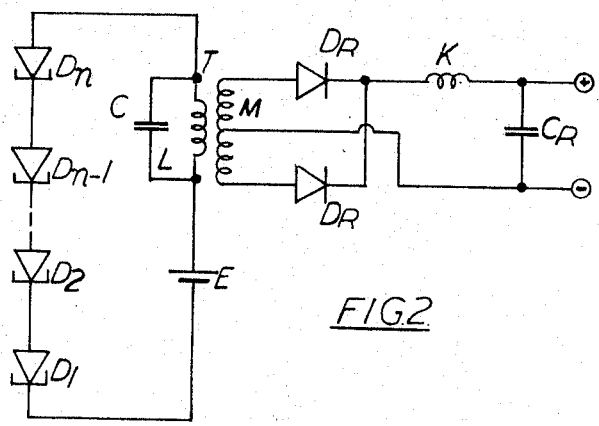
FIG. 2 shows an embodiment of the invention in a D.C. to D.C. converter circuit.

FIG. 2 shows one embodiment of the inverter circuit in a D.C. converter. The circuit comprises a chain of $n$ series-connected tunnel diodes $D_1$, $D_2$ to $D_{n-1}$ and $D_n$ having similar current-voltage characteristics. The chain is connected in series with the source E of unidirectional voltage $V_E$ and the series circuit complete by the inductance L of the primary winding of the transformer T. The inductance L is shunted by a capacitance C which represents the inevitable stray capacitance across the inductance L and the capacitance of any capacitors that may be connected across the inductance L. The secondary winding M of the transformer T is connected to a conventional full wave rectifier circuit comprising the rectifying diodes $D_R$, the optional choke K and the filtering or reservoir capacitor $C_R$.

For the circuit to operate continuously, it is required that the average voltage across each tunnel diode shall be within the region of negative incremental resistance. Thus the input voltage $V_E$ and the number $n$ of the tunnel diodes in the chain must be so related to each other that the value of $V_E$ is greater than $n.V_p$ but does not exceed $n.V_v$.

Figure 3:
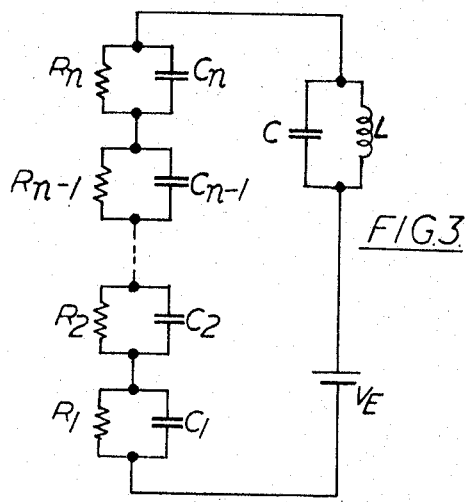
FIGS. 3 and 4 illustrate different aspects of the mode of operation of the basic inverter circuit.

FIG. 3 shows a circuit electrically equivalent to the inverter circuit of FIG. 2 and in which each of the tunnel diodes is replaced by a parallel combination of a resistor and a capacitor representing the equivalent resistance and capacitance of each tunnel diode in the chain. The manner of operation of the circuit may be explained by arbitrarily assuming an initial condition of the circuit, in which the source E has just been switched on and a voltage $V_E$ is applied across the series circuit of the inductance L and the chain of tunnel diodes, the voltage across the tunnel diodes is initially zero. The supply current, which is also the current through the chain, increases from its initial zero value in a first substantially exponential manner at a rate determined by the value of the voltage $V_E$, the inductance L and the effective total chord resistance of all the tunnel diodes in their first region. This initial rate of rise of the supply or chain current is relatively low and thus the rate of change of voltage across the inductance is relatively low, so that—apart from the initial transient current on actually switching on the source E—the current through the capacitance C is negligible. As the chain current increases, the voltage drop across each diode increases towards $V_p$ in accordance with the current-voltage characteristic of each tunnel diode as illustrated in FIG. 1. This process continues until the chain current attains a value equal to the value of peak current $I_p$ of the tunnel diode having the lowest peak current, when the voltage across that tunnel diode will increase rapidly from its peak voltage $V_p$ to its forward voltage $V_F$ at a rate determined mainly by the tunnel diode switching time, the current through the inductance L tending to remain constant during this rapid switching action. At this point, the sudden increment in the voltage across the chain will result in a transient current through the capacitance C. If the value of the capacitance C is suitably related to the dissipative losses in the circuit, then the voltage increment will give rise to a damped sinusoidal oscillation, which during its first half cycle will reduce the chain current and will complement the chain current during its second half cycle, thus tending to cause the tunnel diode with the next lowest value of peak current to switch over. If the values of the peak currents of the tunnel diodes in the chain are selected to be within fairly close limits, then consecutive diodes in the chain will switch at intervals approximately equal to three quarters of the period of a cycle of the damped oscillation.

Figure 4:
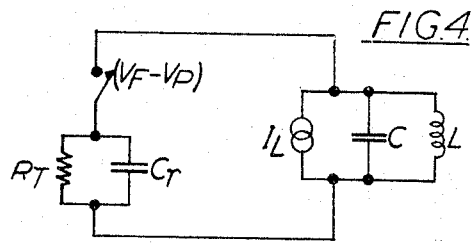

FIG. 4 illustrates the equivalent circuit at the instant of switching. The resistance $R_T$ and the capacitance $C_T$ represent the equivalent circuit of the unswitched tunnel diodes, the voltage $(V_F - V_p)$ is the voltage drop suddenly subtracted from the voltage drop across the other tunnel diodes of the chain when one of them has switched and $I_L$ represents the constant current generator momentarily equivalent to the major portion of the chain current flowing through the inductance. If it is assumed that the time constant $R_T.C_T$ is short compared with the period of oscillation and that the load reflected by the transformer from its secondary into its primary circuit is negligible, then the period of one cycle of the oscillation will be given by $2\pi\sqrt{L.C}$.

In the interest of conversion efficiency, it has been found desirable to select the tunnel diodes to have values of peak current to have a range not exceeding $\pm 2\%$ of the mean value of the peak currents. It has also been found that the optional choke K is a desirable addition to the rectifier circuit, since it has the effect of limiting the leak loading reflected into the primary circuit of the transformer and promoting the tendency of the parallel combination of the capacitance C and the inductance L to produce the damped oscillation described above.

This process is repeated until all the tunnel diodes in the chain have switched from their low voltage state to their high voltage state, i.e. all have undergone the transition from P to F. The voltage across the tunnel diode chain then starts to decrease towards the input voltage $V_E$, this being less than the sum of the $n$ valley voltage $V_v$ of the tunnel diodes. A process similar to the one described above is now initiated as the chain current decreases and a switching transition will be undergone by each tunnel diode in turn as the chain current decreases to its value of valley current $I_v$, the transition now taking place between the points V and S of the characteristic illustrated in FIG. 1. When the tunnel diodes have switched from their high voltage state to their low voltage state, the circuit has effectively returned to its initial position described above and the cycle of operations is repeated.

Figure 5:
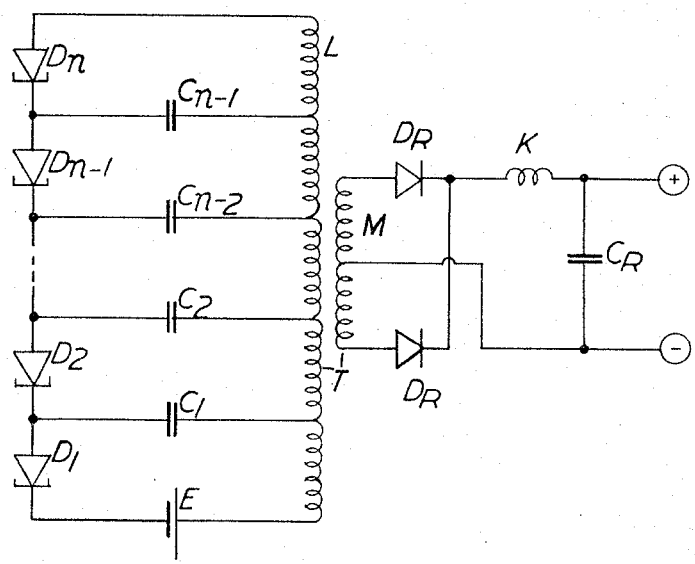
FIG. 5 shows another embodiment of the invention in a D.C. to D.C. converter circuit.

FIG. 5 shows another embodiment of the invertor circuit in a D.C. to D.C. converter. It differs from that described with reference to FIG. 2 in that the inductor L is divided by tapping points into $n$ sections of substantially equal inductance; successive junctions between pairs of tunnel diodes in the chain are individually coupled by capacitors $C_1$, $C_2$ to $C_{n-2}$ and $C_{n-1}$ to the successive tapping points along the inductance of the inductor L. The values of these coupling capacitances must be large in comparison with the junction capacitances of the tunnel diodes. The tunnel diodes are of closely similar electrical characteristics and are in a series chain connected in series with the source E. The secondary circuit may be identical to that shown in FIG. 2 and the mode of energy transfer is identical to that described with reference to the circuit shown in FIG. 2; however, the switching time of the diodes will in general be a rather smaller fraction of the total period of a full cycle of operation of the tunnel diode chain.

To consider the mode of operation of the circuit shown in FIG. 5, let it be assumed that the chain current was initially zero or nearly so and is rising to the value of the peak current of the tunnel diode having the lowest peak current. As soon as that value is exceeded, the voltage across that tunnel diode rises rapidly from $V_p$ to $V_F$. This voltage increment is coupled by the coupling capacitors to the corresponding section of the inductor, which acts as an auto-transformer and applies that increment to all the other diodes in the chain, which are then caused to switch to the high voltage state at almost the same instant. By an analogous process, after all the tunnel diodes have switched to the high voltage state and as the voltage across the chain falls towards the input voltage, the current, on passing through the value of the valley current of the tunnel diode having the highest valley current, will cause one tunnel diode to switch over from V to S as shown in FIG. 1. The voltage decrement due to one tunnel diode having undergone the transition from the high voltage state to the low voltage state will result in the other tunnel diodes of the chain being triggered and the whole chain being returned to the low voltage state, from which assumed initial condition, the complete cycle will then re-start.

It is to be understood that the foregoing description of specific examples of this invention is not to be considered as a limitation on its scope.

What we claim is:
1. A D.C. to D.C. converter circuit comprising:
   a series combination of a source of unidirectional voltage, a chain of series connected tunnel diodes, and an inductor which is divided by tapping points into sections of substantially equal inductance;
   a capacitor coupling each tapping point to an associated junction between pairs of tunnel diodes in the chain; and
   a rectifier circuit coupled to said inductor, whereby an alternating voltage generator across said inductor is applied to said rectifier circuit for deriving a unidirectional current.
2. A circuit according to claim 1, wherein the values of the peak currents of the tunnel diodes in said chain all lie within a range having extreme values differing from the mean value of said range by less than 2 percent.
3. A circuit according to claim 1 wherein said inductor is the primary winding of a transformer.
4. A circuit according to claim 3 wherein said transformer comprises a secondary winding connected to said rectifier circuit.
5. A circuit according to claim 4 wherein said rectifier circuit has a reservoir capacitor connected across its output terminals, whereby D.C. to D.C. conversion is obtained.

References Cited by the Examiner

UNITED STATES PATENTS 2,837,652   6/1958   Nailen _____ 331—107
3,246,256   4/1966   Sommers _____ 331—107

JOHN F. COUCH, *Primary Examiner.*

W. H. BEHA, *Assistant Examiner.*